United States Patent Office 3,130,214
Patented Apr. 21, 1964

3,130,214
IONIC AROMATIC COMPOUNDS OF TRANSITION METALS HAVING ATOMIC NUMBERS FROM 7 TO 14 LESS THAN THAT OF THE NEXT HIGHER RARE GAS
Thomas H. Coffield, Farmington, and Rex D. Closson, Northville, Mich., assignors to Ethyl Corporation, New York, N.Y., a corporation of Virginia
No Drawing. Filed May 15, 1961, Ser. No. 109,809
25 Claims. (Cl. 260—429)

This invention relates to a novel class of ionic organometallic compounds and methods for their preparation.

An object of this invention is to provide new compositions of matter. A further object is to provide new ionic organometallic compounds which improve operation of the internal combustion engine and which are also valuable intermediates in preparation of gasoline additives. Another object is to provide processes for the manufacture of such compounds. Further objects will be apparent from the following discussion. This application is a continuation-in-part of the forfeited application Serial No. 690,191, filed October 15, 1957, and the now abandoned applications Serial No. 690,904, filed October 18, 1957, and Serial No. 690,908, filed October 18, 1957.

According to the present invention we provide new ionic organometallic compounds which consist of a cation made up of a central metal atom whose atomic number is from 7 to 14 less than that of the next higher rare gas, an aromatic molecule coordinately linked to said metal atom by donation of six electrons thereto, and at least one dissimilar electron donating group linked to said metal atom, each of which dissimilar groups donates from 1 to 5 electrons to said metal atom so that the metal atom approaches the electronic configuration of the next higher rare gas within at least one electron, and an anion.

The central metal atom which is of atomic number 7 to 14 less than that of the next higher rare gas can be a metal of group IVB—titanium, zirconium and hafnium; VB—vanadium, niobium and tantalum; VIB—chromium, molybdenum and tungsten; VIIB—manganese, technetium and rhenium; VIII—iron, ruthenium, osmium, cobalt, rhodium, iridium, nickel, palladium and platinum; and IB—copper, silver and gold.

The aromatic molecule which is coordinated to said metal atom by donation of six electrons thereto and which thereby forms an essential part of the cation can in general be any aromatic molecule although aromatic hydrocarbon molecules are preferred. Specifically, mono-nuclear aromatic hydrocarbons of 6 to 12 carbon atoms such as benzene, toluene, mesitylene, ethylbenzene, tetramethylbenzene, etc. are preferred as components of the new cations. However, poly-nuclear hydrocarbons such as naphthalene can be used as can substituted hydrocarbons such as chlorobenzene, anisole and the like.

As the dissimilar (i.e. non-aromatic molecule) electron donor of the cation, electron donors which donate from 1 to 5 electrons are acceptable. Typical examples of one electron donors include mono-valent organic radicals such as alkyl and aryl radicals, and also cyanide radicals, hydrogen atoms and halogen atoms. Among the two electron donors are included the carbonyl group, ammonia, primary, secondary and tertiary amines, phosphine, phosphorus trihalide, etc. The three electron donors include such groups as the nitrosyl group and among the four electron donors are included conjugated diolefins such as butadiene and substituted butadienes as well as diamines, e.g. ethylene diamine. The principal five electron donors are cyclopentadienyl radicals and the substituted cyclopentadienyl radicals, particularly those with alkyl substituents.

The number and nature of the dissimilar electron donating groups are always chosen so that the central metal atom of the cation approaches the electronic structure of the next higher rare gas within at least one electron. In other words, the cations of the new compounds are made up of a combination of central metal atoms, coordinated aromatic molecules and dissimilar electron donating groups so that the metal atom has either the electron structure of the next higher rare gas or is one electron short of the configuration of the next higher rare gas. This critical electronic configuration is an essential feature of our new compounds and appears to play a key role in their usefulness both as materials for improving operation of the internal combustion engine and as intermediates in preparation of organometallic compounds useful as gasoline additives.

The configuration of the electrons around the central metal atom of our new cations is achieved by a different combination, both in nature and number, of donor groups for each metal. Thus, titanium and the IVB metals must, in addition to the aromatic molecule of coordination present in all our cations, be further coordinated with electron donor groups contributing a total of 8 electrons for rare gas configuration and 7 electrons for the configuration which is one short of the rare gas structure. Similarly, vanadium and the other metals of group VB require 7 donating electrons for rare gas structure and 6 for the structure one electron short of the rare gas. In like manner the group VIB metals need 6 and 5 electrons respectively. The group VIIB metals need 5 and 4; the iron subgroup VIII metals need 4 and 3; the cobalt subgroup 3 and 2; the nickel subgroup 2 and 1; whereas the metals of group IB need one electron donated aside from the aromatic molecule to achieve the rare gas structure and zero to achieve the rare gas minus one structure.

The preferred anions of our new compounds are monovalent inorganic anions such as the halogens—fluoride, chloride, bromide and iodide; the cyanide ion, the nitrate ion and the like, although both organic anions and polyvalent inorganic anions are suitable.

Typical compounds of this invention wherein the central metal atom of the cation has achieved the rare gas structure include mesitylene nickel nitrosyl nitrate, toluene cyclopentiadienyl iron nitrate, benzene copper carbonyl chloride, benzene cyclopentadienyl dihydrochromium chloride, toluene vanadium tetracarbonyl fluoride, benzene titanium nitrosyl tricarbonyl bromide, toluene dimethyl copper bromide, ethylbenzene manganese nitrosyl dicarbonyl sulfate, benzene cobalt dicarbonyl iodide, chlorobenzene manganese tris-trichlorophosphine chloride, methylnaphthalene cyclopentadientyl vanadium nitrosyl chloride, benzene cobalt bis-trimethylamine acetate, xylene hydroiron dicarbonyl bromide, benzene dimethyl manganese dicarbonyl iodide, and the like.

Compounds of the present invention wherein the cationic central metal atom is one electron short of the rare gas configuration include benzene chlorocopper chloride, chlorobenzene methyl cobalt carbonyl iodide, triethyl benzene rhenium nitrosyl carbonyl cyandie, xylene tantalum nitrosyl diammonia iodide, benzene cyclopentadienyl vanadium carbonyl bromide, benzene chromium tricarbonyl nitrate, xylene cyclopentadienyl vanadium nitrosyl sulfate, naphthalene dicyanoiron carbonyl chloride, toluene tetracyano-zirconium dicarbonyl iodide, benzene rhodium nitrosyl fluoride, ethylbenzene ethylcopper bromide, benzene nickel carbonyl iodide, benzene chloroiron nitrosyl chloride, benzene cyclopentadienyl manganese iodide, anisole dimethyl palladium iodide, and the like.

In general the present compounds are prepared by reacting a compound of the central metal atom—frequently an inorganic compound—with an aromatic hydrocarbon which is the same as the aromatic hydrocarbon to be coordinated with the central metal in the presence of a Lewis acid-type material and usually also in the presence of the dissimilar electron donor. An example of this is reaction of molybdenum bromide with benzene and carbon monoxide in the presence of aluminum bromide to prepare benzene molybdenum tricarbonyl bromide. In some instances the reaction between the source of the central metal atom and the aromatic hydrocarbon is carried out first as a discrete step and the complex obtained thereby is further reacted with a source of a dissimilar electron donating group. An example of this is reaction of molybdenum hexacarbonyl with benzene and aluminum bromide and reacting the intermediate thus produced with carbon monoxide to produce benzene molybdenum tricarbonyl bromide. A further variation in production of the above compounds comprises reacting a compound of the desired metal, which compound already contains the dissimilar electron donor group or groups with the desired aromatic molecule in the presence of the Lewis acid catalyst. Such a process is typified by reaction of chloromanganese pentacarbonyl with toluene in the presence of aluminum chloride to produce toluene manganese tricarbonyl chloride.

The preferred Lewis acid-type materials are the metal halides of the Friedel-Crafts type, notably the anhydrous aluminum halides. The Friedel-Crafts catalyst is a salt having strong electrophilic characteristics. It can be any hailde of a metal of groups IIA, IIB, IIIA, IVB, VB, VIB, VIIB, and VIII of the periodic table. The halide of groups IIB, IIIA, IVB and VIII are preferred. Illustrative examples of preferred metal halides are zinc difluoride, boron trifluoride, boron trichloride, boron tribromide, boron triiodide, aluminum trichloride, aluminum trifluoride, titanium tetrachloride, titanium tetrabromide, ferric chloride and the like. Other examples of suitable Friedel-Crafts catalysts of generally lesser activity are gallium, indium, thallium, beryllium, manganese, zirconium, vanadium, chromium, and manganese halides.

A preferred species of our invention are ionic aromatic compounds of a group VIII metal having an atomic number which is 10 less than that of the next higher rare gas, the compound containing an anion and a monovalent cation, the cation consisting of the metal atom coordinated with an aromatic compound and stabilized additionally by coordination with a cyclopentadienyl group, the coordination being through the carbon atoms of the carbon rings of the aromatic compound and the cyclopentadienyl group and such coordination being effective to give the metal the electron configuration of the next higher rare gas. More specifically, these compounds contain a cation having a group VIII metal which in its elemental state contains 10 less electrons than the next higher rare gas, the aromatic molecule being bonded to the metal through each of its six ring carbon atoms and the cyclopentadienyl group being bonded to the metal through each of its five ring carbon atoms. Thus, in the compound, the metal has 10 additional electrons which give the metal the configuration of the next higher rare gas, an additional electron, of course, being associated with the anion.

These compounds are believed to have a sandwich-type structure in which the aromatic molecule and the cyclopentadienyl group can be pictured on opposite sides of the metal. For example, in the case of benzene cyclopentadienyl iron iodide, the molecule can be pictured as follows:

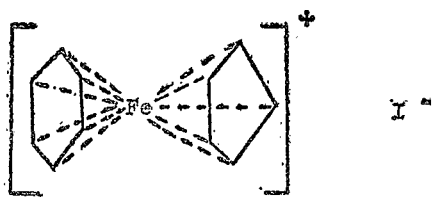

having each of the ring carbon atoms of the cyclopentadienyl group and the benzene molecule bonded to the metal, probably through their pi-electrons, and the metal having the electronic configuration of krypton. These compounds are unexpectedly stable.

It is believed that these are the first known compounds of iron which have an unsymmetrical molecule containing only hydrocarbon constituents. It is particularly unexpected that both an aromatic molecule, such as benzene, and a cyclopentadienyl group can be simultaneously bonded to the metal in a sandwich-type structure.

More specifically these compounds have the general formula:

$$[AMC_y]_x^+ X^-$$

wherein A is an aromatic compound bonded in coordination to M, Cy is a cyclopentadienyl group, M is a group VIII metal which has an atomic number of 10 less than the next higher rare gas of the periodic table, X is an anion and $x$ is the valence of the anion X.

The aromatic portion of the compound can be any aromatic compound but preferably is a compound containing an isolated benzene nucleus. That is it should preferably be an aromatic compound which is free of aliphatic unsaturation on a carbon atom adjacent the benzene ring and which does not contain unsaturation on a carbon atom of a fused ring which is adjacent the benzene nucleus. The preferred aromatic compounds have no aliphatic double bond in conjugated relationship to the ring. Thus, aryl and alkyl substituted aromatic compounds are preferred, as are fused ring compounds having isolated benzene nuclei, that is, having no unsaturation on a carbon atom adjacent to a benzene ring.

The cyclopentadienyl group can be a radical of the general formula:

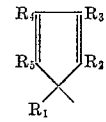

in which "$R_1$" to "$R_5$" can be the same or different and can be hydrogen or organic radicals, including alkyl, cycloalkyl, aryl, or combinations of these radicals, such as alkaryl and aralkyl. Also, any radical is suitable which contains the five carbon ring similar to that found in cyclopentadiene, such as the indenyl radical. In general, cyclopentadienyl groups containing from 5 to about 13 carbon atoms are preferred.

The anion X can be any anion, either of an inorganic or organic type. Thus, the anion can be a halide, nitrate, nitrite, sulfate, sulfide or other inorganic anions. Likewise, the anion can be formate, acetate, benzoate, or a long chain aliphatic radical such as a stearate, laurate or oleate.

Typical examples of compounds within the preferred species of our invention are benzene cyclopentadienyl iron iodide, methylbenzene methyl cyclopentadienyl iron chloride, mesitylene dimethylcyclopentadienyl iron bromide, ethylbenzene octylcyclopentadienyl iron fluoride, bis(phenylbenzene indenyl iron) sulfide, mesitylene methyl indenyl ruthenium cyanide, benzene methylcyclopentadienyl iron acetate, benzene methylcyclopentadienyl osmium naphthanate, benzene cyclopentadienyl iron stearate, benzene cyclopentadienyl ironmyristate, mesitylene methylcyclopentadienyl iron oleate, and the like.

The compounds of our preferred species are prepared by a process which comprises reacting a cyclopentadienyl metal carbonyl compound with an aromatic compound in the presence of a Friedel-Crafts catalyst, such as aluminum chloride. The process can be conducted over a broad temperature range, such as between about 0° C. to 200° C., although temperatures between about 50° and 150° C. are preferred. Generally, the reaction is conducted in a medium consisting only of the aromatic compound which is being reacted with the metal compound. However, if desired, other solvents or diluents can be used.

The cyclopentadienyl iron carbonyl compound can be a dimer as in the case of cyclopentadienyl iron dicarbonyl dimer

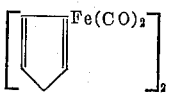

or can be a derivative of the dimer such as, for example, cyclopentadienyl iron dicarbonyl halide e.g.

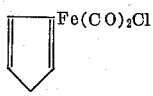

Any derivative of the cyclopentadienyl metal carbonyl is suitable, including any of the other halides, such as the bromide, iodide and fluoride, the cyanides, sulfide or organic compounds, e.g. acetate, propionate and the like. The Friedel-Crafts catalyst is a salt having strong electrophilic characteristics as described previously. It can be any halide of a metal of groups IIA, IIB, IIIA, IVB, VB, VIB, VIIB, and VIII of the periodic table.

When the cyclopentadienyl metal dicarbonyl compound is reacted with the aromatic compound in the presence of such a Friedel-Crafts catalyst there results a complex comprising the aromatic metal cyclopentadienyl cation and an anion consisting of the Friedel-Crafts catalyst complex with halogen. An example of such a complex results from the reaction of cyclopentadienyl iron dicarbonyl chloride with benzene in the presence of aluminum chloride. This complex has the formula:

$$C_6H_6FeC_5H_5{}^+AlCl_4{}^-$$

This intermediate complex can be hydrolyzed with any source of active hydrogen, water being preferred. In some cases it is desirable to use an alcohol, preferably containing from 1 to 6 carbon atoms followed by the addition of a considerable excess of water. The latter technique is particularly useful when the reaction mixture to be hydrolyzed is excessively reactive with water.

Still another preferred species of our invention involves ionic aromatic manganese coordination compounds containing an aromatic manganese-tricarbonyl cation and an anion.

These compounds are exemplified by the aromatic manganese tricarbonyl halides. The aromatic portion of the compound is an aromatic molecule bonded to the manganese through carbon atoms of the benzene nucleus. The preferred halide compounds are represented by the formula $$AMn(CO)_3X$$

where A represents an aromatic compound coordinated with the manganese atom and X represents the halogens, namely, fluorine, chlorine, bromine or iodine. Typical examples of the halide compounds of this invention include benzene manganese tricarbonyl bromide, mesitylene manganese tricarbonyl iodide, toluene manganese tricarbonyl chloride, ethyl benzene manganese tricarbonyl fluoride, and the like.

These compounds are prepared by reacting an aromatic hydrocarbon compound with a manganese pentacarbonyl compound in the presence of a Friedel-Crafts catalyst. The resulting complex which consists of the aromatic manganese tricarbonyl cation complexed with the cationic form of the Friedel-Crafts catalyst is then hydrolyzed and the aqueous layer separated. The desired aromatic manganese tricarbonyl halide compound is recovered from the aqueous solution by salting-out with an excess of an alkali metal halide. For example, when bromomanganese pentacarbonyl is reacted with mesitylene in the presence of aluminum chloride and the resulting reaction mass is hydrolyzed with water and subsequently treated with an excess of potassium iodide, a good yield of mesitylene manganese tricarbonyl iodide results.

These novel ionic aromatic manganese tricarbonyl halide compounds are water soluble ionic compounds which are also soluble in other polar solvents, such as acetone, alcohols, and the like. They are stable to hydrolysis, oxidation and heating up to temperatures of about 200° C. These compounds have other valuable properties which make them useful as chemical intermediates in the preparation of other organomanganese compounds and also valuable as dryers in paints, varnishes, drying oils, and the like.

These compounds are quite different from any compounds heretofore known. The aromatic portion of the compound is actually a molecule, as distinguished from an aryl radical, e.g., phenyl, which is found in organometallic compounds. The aromatic molecule is not bonded to the metal through a single carbon atom, as in the usual aryl metal compounds but, instead, each carbon of the aromatic ring is bonded apparently by coordinate covalence in a fashion such that the ring contributes six electrons to the metal atom. Likewise, the carbonyl groups also are bonded through the carbon atoms and, in consequence, donate two electrons each to the metal atom. Such donation of electrons contributes materially to the stability of the molecule since the metal atom, with the donated electrons, has the electron configuration of the next higher rare gas. Thus, the manganese atom has the electron configuration of krypton. For example, in the case of benzene manganese tricarbonyl bromide, the carbonyl groups donate six electrons and the benzene molecule donates six electrons, one electron being taken by the bromide ion giving a stable compound which can be illustrated as follows:

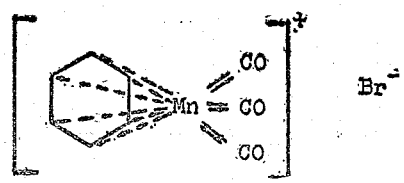

The structure of the compounds of this invention has been proven by infrared analysis and chemical means.

The aromatic compounds coordinated to the metal in the compounds of this invention which are represented by A in the above formula are in general compounds containing an isolated benzene nucleus. That is, aromatic compounds which are free of aliphatic unsaturation on a carbon atom adjacent the benzene ring and which do not contain unsaturation on a carbon atom of a fused ring which carbon atom is adjacent the benzene nucleus. The aromatic compounds applicable to the compounds of this invention have no aliphatic double bond in conjugated relationship to the ring. Thus, aryl and alkyl substituted aromatic compounds are applicable to this invention, as are fused ring compounds having isolated benzene nuclei, that is, having no unsaturation on a carbon atom adjacent to the benzene ring.

In some cases, other aromatic compounds which do not have an isolated nucleus are desirable. Typical examples of such compounds are styrene manganese tricarbonyl halides, methylstyrene manganese tricarbonyl halides, naphthalene manganese tricarbonyl halides, and the like.

The Friedel-Crafts catalysts employed in this invention are salts having electrophilic characteristics. These are usually halides of metals of groups IIA, IIB, IIIA, IVB, VB, VIB, VIIB and VIII of the periodic table as described previously. The preferred catalysts are halides of groups IIIA, IVB, and VIII.

The reaction with the aromatic compound in the presence of a Friedel-Crafts catalyst is preferably carried out in a liquid medium consisting primarily of the aromatic compound which is reacted with the manganese pentacarbonyl reactant. Thus, if it is desired to make the benzene manganese tricarbonyl ion, the reaction is conducted in a benzene medium. The reaction can also be conducted in a halogenated benzene, such as chlorobenzene or bromobenzene, in which event the chloroaromatic or bromoaromatic manganese tricarbonyl halide is formed. Other substituted aromatic compounds can be produced in like manner.

In addition to the aromatic compound, diluents can be employed. Typical examples of such diluents are nitrobenzene; straight chain hydrocarbons, such as pentane, hexane, decane, and the like. These diluents can be used in concentrations of from 0.01 to 100 parts per part of the aromatic compound.

The manganese pentacarbonyl reactant employed in the process of this invention is either manganese carbonyl itself or a halomanganese pentacarbonyl which is derived therefrom. Manganese carbonyl exists as the dimer having the formula $[Mn(CO)_5]_2$, and is susceptible to preparation by several methods. One of these methods comprises reacting a manganous halide with a Grignard reagent in a solvent, such a tetrahydrofuran, and treating the resulting intermediate with carbon monoxide at elevated temperature and pressure. The manganese carbonyl compound is recovered from the reaction mixture by steam distillation followed by sublimation. The halomanganese pentacarbonyl compounds are derived from manganese pentacarbonyl by direct halogenation.

The halogenation of the manganese pentacarbonyl can be conducted over a wide temperature range such as, for example, −70° to 100° C., although the reaction is preferably conducted at a temperature of 0° to 50° C. The reaction is preferably conducted in an inert liquid, preferably one which is a solvent for the manganese pentacarbonyl, for example, chlorinated hydrocarbons such as ethyl chloride and carbon tetrachloride, and the like; aliphatic hydrocarbons such as pentane and hexane; aromatic solvents such as benzene, toluene and xylene; solvents such as carbon disulfide and organic acids such as an acetic acid. The concentration of solvent is not critical as long as there is enough to provide solubility for manganese carbonyl. Any of the halides are suitable in this reaction such as, for example, the chlorides, bromides, iodides or fluorides.

The reaction of the aromatic compound with the manganese pentacarbonyl reactant is normally conducted at a temperature of from about 20° to 300° C. A more preferred temperature range is in the order of 50° to 200° C.

Our invention is more fully illustrated by way of the following examples in which all parts and percentages are by weight unless otherwise indicated.

*Example I*

Bromomanganese pentacarbonyl, prepared by bromination of manganese carbonyl with bromine, was reacted with mesitylene under reflux in the presence of aluminum chloride. The mixture was kept under a nitrogen atmosphere. A red color developed which gave way to clear yellow, and substantial amounts of a gas were evolved. Upon cessation of gas evolution the mixture was hydrolyzed with water, resulting in a pale yellow water layer. Upon saturating this solution with potassium iodide, the product, mesitylene manganese tricarbonyl iodide, crystallized as ivory colored crystals in 90 percent yield.

*Analysis.*—Calculated for $C_{12}H_{12}O_3MnI$: C, 37.4; H, 3.12; Mn, 14.2; I, 32.9. Found: C, 37.6; H, 3.09 Mn, 14.6; I, 33.1.

*Example II*

Cuprous chloride is reacted with benzene and methyl aluminum sesquichloride by heating under inert atmosphere in excess benzene to produce benzene methyl copper chloride. The reaction is carried out under anhydrous conditions with care to protect the reactants from atmospheric attack. The desired product is obtained upon hydrolysis of the reaction mixture with water.

*Example III*

A mixture of 10 parts of bromomanganese carbonyl, 5 parts of aluminum chloride and 130 parts toluene was refluxed for five hours under inert atmosphere. After cooling the mixture was hydrolyzed with 80 parts of water, filtered and the yellow-water layer separated. Upon the addition of solid potassium iodide to the aqueous solution toluene manganese tricarbonyl iodide was obtained in 84 percent yield.

*Analysis.*—Calculated for $C_{10}H_8MnO_3I$: C, 33.6; H, 2.25; Mn, 15.4; I, 35.6. Found: C, 33.58; H, 2.23; Mn, 16.0; I, 36.0.

In a similar run using the same conditions but with slightly varying reactant proportions a 94.5 percent yield of the same product was obtained.

*Example IV*

Cobalt carbonyl is reacted with benzene in the presence of aluminum chloride to produce as an intermediate dicarbonyl chloride. Without isolation this intermediate is reacted with nitric oxide under elevated pressure to produce as the final product benzene cobalt nitrosyl chloride.

*Example V*

Dicyclopentadienyl diiron tetracarbonyl was produced as an intermediate by reaction of dicyclopentadiene with iron pentacarbonyl at reflux. This recrystallized intermediate was treated in methanol-chloroform-concentrated hydrochloric acid solution with oxygen for 15 hours following which the solution was evaporated under vacuum to a gummy red residual solid. This residue was extracted with water and the aqueous solution dried with magnesium sulfate following which the compound, cyclopentadienyl iron dicarbonyl chloride, was precipitated therefrom by addition of low boiling petroleum ether. This product (20 parts) was heated with 15 parts of aluminum chloride and 430 parts of mesitylene for 3 hours at 165° C. During the course of reaction a gas was given off and a dark liquid layer formed at the bottom of the reactor. At the end of the reaction period the mixture was cooled, hydrolyzed with 200 parts of water, filtered and the yellow water layer separated. The desired mesitylene cyclopentadienyl iron iodide was recovered from this aqueous layer in 40 percent yield by precipitation with potassium iodide.

*Analysis.*—Calculated for $C_{14}H_{17}FeI$: C, 45.8; H, 4.6; Fe, 15.2. Found: C, 45.6; H, 4.73; Fe, 15.0.

*Example VI*

Nickelous chloride is reacted with benzene and methyl aluminum sesquichloride to produce benzene dimethyl nickel chloride in a manner similar to that of Example II.

*Example VII*

Cyclopentadienyl manganese chloride is reacted with benzene in the presence of aluminum tribromide to produce benzene cyclopentadienyl manganese bromide. The reaction is carried out under anhydrous conditions and under an inert argon atmosphere. Excess benzene is used as the reaction medium and the reaction is carried out at reflux with appropriate heating and cooling means. The product is obtained upon hydrolysis of the reaction mixture.

*Example VIII*

Chromium hexacarbonyl is reacted with benzene and aluminum chloride in a manner similar to the procedure of Example IV to produce an intermediate which when reacted with carbon monoxide under elevated temperature and pressure leads to formation of benzene chromium tricarbonyl chloride.

*Example IX*

Cyclopentadienyl molybdenum tricarbonyl chloride is reacted with benzene and aluminum chloride and simultaneously with carbon monoxide at elevated pressure to produce benzene cyclopentadienyl molybdenum carbonyl chloride. Reaction is carried out in a pressure vessel provided with means for agitation and an inert blanket is provided by the atmosphere of carbon monoxide within the pressure vessel.

Example X

Nickel carbonyl is reacted with benzene and aluminum chloride to produce benzene nickel carbonyl chloride as an intermediate. This intermediate is reacted with nitric oxide according to the procedure of Example IV to produce as the final product benzene nickel nitrosyl chloride.

Example XI

Benzene vanadium tetracarbonyl is treated with oxygen in the presence of concentrated hydrobromic acid in a manner similar to that of Example V to produce the compound benzene vanadium tetracarbonyl chloride.

Example XII

Titanium tetrachloride is reacted with phenyl magnesium bromide under Grignard conditions to produce diphenyl titanium dibromide. This intermediate when treated with carbon monoxide under pressure and in the presence of metallic copper gives as a further intermediate benzene titanium tetracarbonyl. This material, when further treated with oxygen in the presence of concentrated HBr is converted to benzene titanium tetracarbonyl bromide and this product in turn when treated with nitric oxide according to the procedure of Example X, yields as the final product benzene titanium nitrosyl tricarbonyl bromide.

Example XIII

Cupric chloride when treated with benzene in the presence of aluminum chloride according to the procedure of Example VIII yields as the product benzene chlorocopper chloride.

Example XIV

A mixture of 5 parts of dicyclopentadienyl diiron tetracarbonyl, 2.2 parts of aluminum chloride and 65 parts of mesitylene were heated at reflux temperature of the system until gas evolution had stopped. About a theoretical quantity of carbon monoxide gas was obtained. After cooling to about room temperature the mixture was hydrolyzed with 30 parts of water. The reaction mixture was thereafter filtered and the water layer was saturated with potassium iodide. Mesitylene cyclopentadienyl diiron iodide precipitated in a yield of 24 percent based upon the total iron. The product was identified by an infrared spectrum.

Example XV

Example V is repeated except that benzene is employed instead of mesitylene, methylcyclopentadienyl is used instead of the cyclopentadiene and boron trichloride is employed as the catalyst. The product is isolated after addition of sodium acetate to give benzene cyclopentadienyl iron acetate product.

Example XVI

Example XIV is repeated except that diphenyl is employed instead of mesitylene, n-octyl cyclopentadiene is employed instead of cyclopentadiene and a complex catalyst of $BF_3$ is employed as a Friedel-Crafts catalyst. In this example the product is isolated as diphenyl n-octylcyclopentadienyl iron nitrate by the addition of lithium nitrate.

Example XVII

Example XIV is repeated except that ethylbenzene is employed with indene, using a catalyst zinc bromide. The product, bis(ethylbenzene indenyl iron) sulfate, is produced upon addition of potassium sulfate to the reaction mixture.

Example XVIII

Example V is repeated except that tetralin is reacted with methylcyclopentadienyl ruthenium dicarbonyl bromide and the reaction product is isolated with sodium sulfate. The di(tetralin methylcyclopentadienyl ruthenium) sulfate is recovered in good yield.

Example XIX

Example V is repeated except that methylbenzene is reacted with cyclopentadienyl osmium dicarbonyl chloride using boron trichloride. This reaction product is then treated with potassium stearate to form methylbenzene cyclopentadienyl osmium stearate in excellent yield.

Example XX

Dimethylcyclopentadienyl iron dicarbonyl iodide is heated with mesitylene in the presence of $AlCl_3$ and the product is precipitated with sodium myristate. The mesitylene dimethylcyclopentadienyl iron myristate is produced in good yield.

Example XXI

Example V is repeated except that the reaction product is precipitated with calcium cyanide to produce mesitylene cyclopentadienyl iron cyanide.

Example XXII

A mixture of 2.75 parts of bromomanganese pentacarbonyl, 2.2 parts of aluminum chloride, and 87 parts of dry benzene were refluxed for one hour without stirring. During this time the reaction mass changed from dark orange to yellow and two equivalents of gas were evolved. The cooled reaction mass was hydrolyzed with 200 parts of water, filtered, and the two resulting phases separated. Upon the addition of solid potassium iodide to the water phase, a yellow solid precipitated. The infrared spectrum of the product proved the presence of an aromatic benzene ring and the carbonyl groups bonded to metal. On the basis of the infrared spectrum, gas evolution and chemical analysis of the recrystallized product, it is established that the isolated compound is benzene manganese tricarbonyl iodide.

Example XXIII

Two parts of manganese pentacarbonyl, 1.5 parts of aluminum chloride and 258 parts of mesitylene were heated at reflux (165°) for two hours. A gas was evolved and the mesitylene solution became dark red. Upon hydrolysis, a gas was given off and a yellow water layer obtained. Solid potassium iodide was added to precipitate mesitylene manganese tricarbonyl iodide (identified by infrared spectrum).

Example XXIV

The procedure of Example III is repeated using iodomanganese pentacarbonyl as the manganese carbonyl reactant, aluminum tribromide as the catalyst and p-hexyl biphenyl as the aromatic compound. The p-hexyl biphenyl manganese tricarbonyl ion is precipitated as the picrate by addition of excess picric acid.

Other compounds of this invention with diverse anionic constituents are prepared in a similar manner. Both organic anions and polyvalent inorganic anions are suitable. Examples of these include sulfate, oleate, oxalate, Reineckate, vanadate, and the like. The preferred anions of our new compounds are monovalent inorganic anions, such as the halogens, the cyanide ion, the nitrate ion, and the like.

Example XXV

The procedure of Example III is followed using ethyl benzene as the aromatic reactant and carrier, chloromanganese pentacarbonyl as the manganese carbonyl reactant and ferric chloride as the Friedel-Crafts catalyst. The ethyl benzene manganese tricarbonyl halide ion is precipitated as the oxalate.

Further examples of the compounds of this invention include toluene manganese tricarbonyl fluoride, ethyl benzene manganese tricarbonyl butyrate, biphenyl manganese tricarbonyl acetate, benzene manganese tricarbonyl naphthenate, hexyl benzene manganese tricarbonyl oleate, di(benzene manganese tricarbonyl) sulfate, and the like.

Certain of the novel compounds of this invention are extremely useful as intermediates in the preparation of cyclopentadienyl manganese tricarbonyl compounds. When an aromatic manganese tricarbonyl halide compound is reacted with a cyclopentadiene in an aqueous base, a cyclopentadienyl manganese tricarbonyl compound results. This is illustrated by the following example in which all parts and percentages are by weight unless otherwise indicated.

*Example XXVI*

Two hundred parts of mesitylene manganese tricarbonyl iodide were dissolved in about 5,000 parts of a 10 percent potassium hydroxide solution maintained under nitrogen. To this was added 500 parts of cyclopentadiene and the mixture was refluxed for 10 minutes. After cooling, approximately 350 parts of ether was added and the mass filtered through a filter aid. The filtrate was evaporated and the oily residue sublimed at 60° under reduced pressure. A quantity of yellow crystals of cyclopentadienyl manganese tricarbonyl was obtained which melted at 75–76° and which was positively identified by an infrared spectrum.

In a similar manner, methylicyclopentadienyl manganese tricarbonyl is prepared by the reaction of toluene manganese tricarbonyl bromide with methyl cyclopentadiene using aqueous sodium hydroxide as a solvent, while ethyl cyclopentadienyl manganese tricarbonyl is prepared by the reaction of ethyl benzene manganese tricarbonyl chloride and ethyl cyclopentadiene in aqueous lithium hydroxide as a solvent. Other cyclopentadienyl manganese tricarbonyl compounds are similarly prepared from cyclopentadiene and an aromatic manganese tricarbonyl halide compound of this invention using aqueous base as a solvent.

The above examples illustrate preparation of typical new ionic compounds of this invention and also illustrate typical reaction procedures used therefor. Still other compounds of this invention are, m-dimethylbenzene indenyl vanadium carbonyl iodide, 2-phenylpentane dichlorovanadium dinitrosyl iodide, p-diphenylbenzene triisobutyl vanadium tricarbonyl sulfate, 1,3,5-triethylbenzene iodovanadium triammonia bromide, benzenevanadium tri-tert-phenylamine carbonyl nitrite, benzene dicyclopentadienyl titanium dibromide, toluene titanium trinitrosyl chloride, benzene chromium tricarbonyl bromide, ethylbenzene dinitrosyl, di(toluene cyclopentadienyl cyanochromium)sulfate, mesitylene methylcyclopentadienyl bromomanganese iodide, allylbenzene indenyl methylmanganese nitrate, sec-butylbenzene trichlorochromium nitrosyl formate, ethylbenzene molybdenum triammonia iodide, benzene pentachloro cyanomolybdenum iodide, toluene manganese tris-dodecylamine chloride, benzene iron tricarbonyl dibromide, ethylbenzene iron dinitrosyl dichloride, toluene cyclopentadienyl iron cyanide, mesitylene methylcyclopentadienyl cobalt dibromide, benzene indenyl methyl iron sulfate, ethylbenzene iron triammonia dichloride, benzene pentachloro iron cyanide, toluene manganese tris-dodecylamine nitrate, ethylbenzene nickel nitrosyl cyanide, mesitylene nickel diammonia dinitrate, benzene copper nitrosyl dichloride, ethylbenzene copper carbonyl acetate, and the like.

The ionic compounds of the present invention possess utility as agents in improving the operation of the internal combustion engine. Since the compounds are ionic it is generally preferred to take advantage of this utility by injecting the new compounds directly into the combustion chamber of the internal combustion engine as an aqueous solution of suspension. When injected into the chamber in such a fashion it is found that the new compounds exhibit potent antiknock activity and also provide important deposit modification effects. Ordinarily we prefer to inject our novel compound directly into the combustion chamber as a separate stream rather than via the gasoline-air mixture. In general, it is preferable to provide a separate entrance for this injection which is coupled with the ordinary inlet valve of the combustion chamber so that the additive is introduced into the chamber simultaneously with the fuel-air mixture. When introduced in such a manner and with such timing best results in terms of antiknock enhancement of the fuel are found. For good deposit modification control with concomitant benefits in reduction of surface ignition, spark plug fouling, and the like, the timing of interjection of the new compound into the chamber is not as important, and it is not necessary to coincide its interjection with that of the fuel-air mixture. No doubt this is due to the fact that these effects are at least in part obtained via chamber deposits formed by combustion of our compounds.

As an illustration of the above, we provide an ordinary internal combustion engine with a separate inlet line to the combustion chamber which is connected at its opposite extremity with a tank containing approximately 100 milliliters of a 2 percent solution of anisole hydrocobalt carbonyl chloride in water. This supply tank is pressurized with nitrogen at 2000 p.s.i. In the line connecting the supply tank with the combustion chamber is located a shut-off valve linked to the gasoline inlet valve so that the valve in the supplementary line is open when the inlet valve is open and closed when the inlet valve is closed. The size of the line from the supply tank to the combustion chamber is such that one milliliter of aqueous solution is injected into the combustion chamber for each 100 milliliters of gasoline-air mixture. Operation in this manner is found to enhance the antiknock activity of the gasoline.

As an alternative arrangement the supply of aqueous solution can be injected into the gasoline intake manifold system and then swept into the combustion chamber with the gasoline.

Some of our new compounds particularly those wherein the anion is composed of a long chain organic radical are soluble in gasoline and can be used directly therein as a fuel additive.

Another utility of the present compounds is an intermediate in the production of fuel-soluble organic metallic compounds useful as antiknock agents. The previous Example XXVI typifies such a use, which is applicable to those compounds wherein the central metal atom is one electron short of the rare gas configuration. In general, the antiknock agents are prepared by reduction of the ionic compound to the zero valence state of the central metal atom, or by metathesis.

Cyclopentadienyl manganese tricarbonyl compounds are known to be potent antiknocks when dissolved in gasoline. For example, when methylcyclopentadienyl manganese tricarbonyl was added to a commercial gasoline having an initial boiling point of 94° F. and a final boiling point of 390° F. in amount sufficient to prepare a composition containing 1 gram of manganese per gallon, the octane number of the gasoline was raised from 83.1 to 92.3 as determined by the Research Method. The Research Method of determining the octane number of a fuel is generally accepted as a method of test which gives a good indication of fuel behavior in full-scale automotive engines under normal driving conditions and the method most used by commercial installation in determining the value of a gasoline or additive. The Research Method of testing antiknocks is conducted in a single-cylinder engine especially designed for this purpose and referred to as the CFR engine. This engine has a variable compression ratio and during the test the temperature of the jacket water is maintained at 212° F. and the inlet air temperature is controlled at 125° F. The engine is operated at a speed of 600 r.p.m. with a spark advance of 13° before top dead center. The test method employed is more fully described in test procedure D–908–55 contained in the 1956 edition of "ASTM Manual of Engine Test Methods for Rating Fuels."

Other compounds prepared from the claimed compounds by the described methods give similar results in gasoline.

For example, aromatic-manganese tricarbonyl iodide compounds of this invention can be used to make aromatic cyanomanganese dicarbonyl compounds which are demonstrated antiknocks.

Example XXVII

Mesitylene manganese tricarbonyl iodide (3.86 parts) was dissolved in 100 parts of hot water and, while boiling, 3 parts of potassium cyanide were added. Mesitylene cyanomanganese dicarbonyl, a yellow precipitate, was formed directly, carbon monoxide being evolved in about one mole equivalent quantities. The reaction mixture was cooled and filtered and 2.26 parts of mesitylene cyanomanganese dicarbonyl product was obtained. This product was recrystallized in water three times, washed with a small amount of diethyl ether and dried under reduced pressure. The melting point of the mesitylene cyanomanganese dicarbonyl was 170–172° C. Chemical analysis of the product was as follows:

|   | Found | Calculated |
|---|-------|------------|
| C | 55.8  | 56.0       |
| H | 4.79  | 4.65       |
| N | 5.45  | 5.45       |

An infrared spectrum confirmed the structure of this product. The product obtained in this example is an effective antiknock when used in fuels for internal combustion engines.

The compounds of this invention also possess other uses. For example, they may be incorporated in paints, varnish, printing inks, synthetic resins of the drying oil type, oil enamels and the like, to impart excellent drying characteristics to such compositions. Generally speaking, from 0.01 to 0.5 percent of manganese as a compound of this invention is beneficially employed as a dryer in such a composition.

For example, to a typical varnish composition containing 100 parts ester gum, 173 parts of tung oil, 23 parts of linseed oil and 275 parts of white petroleum naphtha is added 3.0 parts of mesitylene manganese tricarbonyl chloride. The resulting varnish composition is found to have excellent drying characteristics. Equally good results are obtained when other drying oil compositions and other aromatic manganese tricarbonyl halide compounds of this invention are employed.

Other important uses of the ionic aromatic metal compounds of the present invention include the use thereof as chemical intermediates, particularly in the preparation of metal and metalloid containing polymeric materials. In addition, some of the compounds of this invention can be used in the manufacture of medicinals and other therapeutic materials, as well as agricultural chemicals such as, for example, fungicides, defoliants, growth regulants, and so on.

In addition, certain of the novel compounds of this invention are also useful in wax compositions for the preparation of candles which burn with a minimum of soot formation. For this purpose, from about 0.005 to about 7 percent of iron as a compound of this invention is incorporated into the wax composition prior to fabrication of the candle. The candles containing iron compounds of this invention are preferably prepared from paraffin wax or compositions containing a major proportion of paraffin wax. However, other materials may be incorporated into the paraffin wax with equally good results. Other waxes, stearic acid, hydrostearic acid, beeswax, microcrystalline wax, ceresin, β-naphthol, and the like, including mixtures, may be used along with the paraffin wax. As an illustrative example, a candle is prepared from a paraffin wax having a melting point of about 55° C. by adding thereto 6 percent stearic acid, 10 percent hydrostearic acid, and 2 percent iron as toluene methylcyclopentadienyl iron stearate. A candle molded from this composition burns with a minimum of soot formation. When used as an additive to candles, it is preferred to employ compounds of this invention wherein the anion is derived from an organic acid. Particularly preferred compounds are those wherein the anion is derived from a long chain fatty acid, such as maleic acid, stearic acid, hydrostearic acid, and the like.

Having fully described the novel aromatic metal compounds of the present invention, the need therefor, and the best methods devised for their preparation, we do not intend that our invention be limited except within the spirit and scope of the appended claims.

We claim:

1. As a new composition of matter, ionic organometallic compounds consisting of a cation having a positive charge of one and containing a central transition metal atom whose atomic number is from seven to fourteen less than that of the next higher rare gas, an aromatic hydrocarbon molecule containing an isolated benzene nucleus and having from 6 to 18 carbon atoms, said molecule being coordinately linked to said metal by donation of six electrons thereto, and at least one dissimilar electron-donating group coordinately linked to said metal atom, each of said dissimilar groups donating from one to five electrons to said metal atom so that said metal atom in the cation achieves the electronic configuration of the next higher rare gas, and an anion having a minus charge of one.

2. The compounds of claim 1 wherein said central metal atom is iron.

3. The compounds of claim 1 wherein said central metal atom is manganese.

4. The compounds of claim 1 wherein the anion is an inorganic anion.

5. The compounds of claim 1 wherein said inorganic anion is a halogen ion.

6. An ionic aromatic compound of a group VIII metal having an atomic number which is 10 less than that of the next higher rare gas, said compound containing an anion and a monovalent cation, said cation consisting of a single metal atom coordinated with an aromatic hydrocarbon compound containing an isolated benzene nucleus and having from 6 to 18 carbon atoms, and stabilized additionally by coordination of said metal atom with a cyclopentadienyl hydrocarbon group containing from 5 to about 13 carbon atoms, said coordination being through the carbon atoms of the aromatic ring of said aromatic compound and the cyclopentadienyl ring of said cyclopentadienyl group and such coordination being effective to give said metal atom the electron configuration of the next higher rare gas.

7. The compound of claim 6 where said group VIII metal is iron.

8. The compound of claim 6 where said anion is a halogen ion.

9. The compound of claim 8 where said halogen is iodine.

10. Mesitylene cyclopentadienyl iron iodide.

11. The compound of claim 6 wherein said anion is derived from a hydrocarbyl carboxylic acid containing 1–18 carbon atoms.

12. The compound of claim 11 wherein said anion is derived from a long chain hydrocarbyl fatty acid having 12–18 carbon atoms.

13. The process for the preparation of a mesitylene cyclopentadienyl iron halide which comprises reacting a hydrocarbon cyclopentadienyl iron dicarbonyl halide in which the cyclopentadienyl group contains from 5 to about 13 carbon atoms with mesitylene in the presence of a Friedel-Crafts catalyst to form a complex comprising the mesitylene cyclopentadienyl iron cation and an anion consisting of the Friedel-Crafts catalyst complex with halogen, and hydrolyzing said complex with a source of active hydrogen to produce said mesitylene cyclopentadienyl iron halide.

14. Process for the preparation of a compound of claim 6, said process comprising reacting
(A) a cyclopentadienyl metal dicarbonyl halide, wherein the cyclopentadienyl group is a hydrocarbon radical containing from 5 to about 13 carbon atoms and the metal atom is a group VIII metal having an atomic number of ten less than that of the next higher rare gas, with
(B) an aromatic hydrocarbon compound containing an isolated benzene nucleus and having from 6 to 18 carbon atoms, in the presence of a Friedel-Crafts catalyst;
to form a complex comprising an aromatic metal cyclopentadienyl cation and an anion consisting of the Friedel-Crafts catalyst complex with halogen, and hydrolyzing said complex with a source of active hydrogen to produce said compound of claim 6.

15. Process for the preparation of an iron compound of claim 6, said process comprising reacting
(A) a cyclopentadienyl iron dicarbonyl halide, wherein the cyclopentadienyl group in said compound is a hydrocarbon radical containing from 5 to about 13 carbon atoms, with
(B) an aromatic hydrocarbon compound containing an isolated benzene nucleus and having from 6 to 18 carbon atoms, in the presence of a Friedel-Crafts catalyst;
to form a complex comprising an aromatic iron cyclopentadienyl cation and an anion consisting of the Friedel-Crafts catalyst complex with halogen, and hydrolyzing said complex with a source of active hydrogen to produce said compound of claim 6.

16. A process for the preparation of mesitylene cyclopentadienyl iron iodide, said process comprising reacting cyclopentadienyl iron dicarbonyl chloride with mesitylene in the presence of aluminum chloride to form a complex comprising the mesitylene cyclopentadienyl iron cation and an anion consisting of the Friedel-Crafts complex with halogen and hydrolyzing said complex with a source of active hydrogen and subsequently reacting said hydrolyzed complex with potassium iodide to yield said mesitylene cyclopentadienyl iron iodide.

17. An ionic aromatic manganese coordination compound consisting of an aromatic manganese tricarbonyl cation wherein the aromatic group is a hydrocarbon molecule having from 6 to 18 carbon atoms and having an isolated benzene nucleus, said aromatic group donating six bonding electrons to the manganese atom, and an anion.

18. The compound of claim 17 wherein said anion is a halide.

19. Benzene manganese tricarbonyl iodide.

20. Mesitylene manganese tricarbonyl iodide.

21. Toluene manganese tricarbonyl iodide.

22. A process which comprises reacting an aromatic hydrocarbon compound having an isolated benzene nucleus, having 6 to 18 carbon atoms, and being free of acetylenic unsaturation with a manganese pentacarbonyl compound selected from the group consisting of manganese pentacarbonyl dimer and halomanganese pentacarbonyl and a Friedel-Crafts catalyst at temperatures up to 200° C.

23. The process of claim 22 wherein the aromatic compound is mesitylene, the manganese pentacarbonyl compound is manganese pentacarbonyl bromide, and the Friedel-Crafts catalyst is aluminum chloride.

24. The process of claim 22 where the Friedel-Crafts catalyst is an aluminum halide.

25. Process for the preparation of a cyclopentadienyl manganese tricarbonyl compound which comprises reacting, in an aqueous base, a cyclopentadienyl hydrocarbon with an ionic aromatic manganese coordination compound consisting of an aromatic manganese tricarbonyl cation wherein the aromatic group is a hydrocarbon molecule containing 6 to 18 carbon atoms and having an isolated benzene nucleus, said aromatic group donating 6 bonding electrons to the manganese atom, and an anion.

References Cited in the file of this patent

UNITED STATES PATENTS

| | | |
|---|---|---|
| 2,409,167 | Veltman | Oct. 8, 1946 |
| 2,680,756 | Panson | June 8, 1954 |
| 2,818,416 | Brown et al. | Dec. 31, 1957 |
| 2,870,180 | Kozikowsky | Jan. 20, 1959 |
| 2,916,503 | Kozikowsky | Dec. 8, 1959 |
| 2,953,586 | Hafner et al. | Sept. 20, 1960 |

FOREIGN PATENTS

| | | |
|---|---|---|
| 297,989 | Great Britain | Oct. 4, 1928 |

OTHER REFERENCES

Piper et al.: J. Inorganic and Nuclear Chem., vol. 3 (1956), pp. 104–124.

Cotton: Chemical Reviews, vol. 55 (1955), pp. 551–594.

Kharasch et al.: J.A.S.C., vol. 58 (1936), pp. 1733–1738.

Rochow et al.: The Chemistry of Organo-Metallic Compounds, (1957), p. 315.